United States Patent
Clark et al.

[11] Patent Number: 6,086,643
[45] Date of Patent: Jul. 11, 2000

[54] METHOD FOR THE FABRICATION OF ELECTROCHEMICAL CELLS

[75] Inventors: Duncan Guy Clark, Hermitage; Stephen Hampden Joseph; Stewart Ernest Male, both of East Grinstead, all of United Kingdom

[73] Assignee: National Power PLC, Wiltshire, United Kingdom

[21] Appl. No.: 09/091,220

[22] PCT Filed: Dec. 19, 1996

[86] PCT No.: PCT/GB96/03162

§ 371 Date: Dec. 2, 1998

§ 102(e) Date: Dec. 2, 1998

[87] PCT Pub. No.: WO97/24778

PCT Pub. Date: Jul. 10, 1997

[30] Foreign Application Priority Data

Dec. 28, 1995 [GB] United Kingdom .................. 9526577

[51] Int. Cl.⁷ ............................ H01M 10/04; H01M 8/24
[52] U.S. Cl. ......................... 29/623.2; 29/623.1; 429/36
[58] Field of Search ............................... 29/623.2, 623.1; 429/36

[56] References Cited

U.S. PATENT DOCUMENTS 3,320,092  5/1967  Tapsell .
3,565,693  2/1971  Tapsell .

FOREIGN PATENT DOCUMENTS

| 402909 | 12/1990 | European Pat. Off. . |
|---|---|---|
| 2292345 | 6/1976 | France . |
| 2410058 | 6/1979 | France . |
| 2700639 | 7/1994 | France . |
| 1805819 | 7/1969 | Germany . |
| 4342485 | 3/1995 | Germany . |
| 58-078372 | 5/1983 | Japan . |
| 63-252368 | 10/1988 | Japan . |
| 1145751 | 3/1969 | United Kingdom . |

*Primary Examiner*—John S. Maples
*Attorney, Agent, or Firm*—Antonelli, Terry, Stout & Kraus, LLP

[57] ABSTRACT

A method of fabricating an electrochemical or galvanic cell comprising a plurality of electrochemical components, which electrochemical components are joined together in a stack, which method comprises: i) providing a first component formed from a deformable polymeric material with at least one substantially continuous groove comprising a female opening having a width of "w" and a depth of "h"; ii) providing a second component with at least one substantially continuous upstand having a width of >"w" and a height of <"h"; iii) pressing the first and second components together in order to provide an integral seal between the upstand on the second component and the opening in the first component, with the seal between the parts being provided by sealing engagement of the sides of the upstand with the sides of the openings; and iv) joining a plurality of first and second components together to form a stack.

10 Claims, 3 Drawing Sheets

METHOD FOR THE FABRICATION OF ELECTROCHEMICAL CELLS

The present invention relates to a method for the fabrication of electrochemical cells and, in particular, to a method for the fabrication of industrial electrolytic or galvanic cells which comprise a plurality of components joined together in a stack.

Industrial electrolytic or galvanic cells, such as secondary batteries, fuel cells and electrolysers, typically consist of modules which each comprise a number of stacked, layered components which are clamped together in a stack. For example, in a secondary battery of the redox flow type the components typically consist of electrically insulating flow-frames, each containing an electrode, with a plurality of such flow-frames being sandwiched together with other components such as membranes and meshes. Secondary batteries of this type are well known to a person skilled in the art.

In the assembly of the modules from their component parts the most important considerations are:

i) in order to ensure that the fluids which are inside the stack are isolated from each other and contained successfully with minimal leakage to the outside, it is necessary for satisfactory seals to be provided between the individual layers of the stack and between the individual compartments within the stack, for example, by sealing a frame around the perimeter of each electrode;

ii) each component layer of the stack should be accurately positioned in relation to the adjacent components; and iii) the sandwiched arrangement of electrodes, membranes and meshes should remain intact and undisturbed as the rest of the stack is formed and the unit sealed. Some membranes may have a tendency to tear, crease, fold or puncture and/or may be highly sensitive to the partial pressure of water.

Conventionally, fluid seals have been achieved, for example, by employing an elastomeric seal arrangement between each flow frame, such as an O-ring or flat gasket. Conventional locating and holding devices may be used to position individual components with respect to their neighbours and then to fix them in place to form a sub-module. However, when the stack consists of large numbers of components, a reliable assembly of the stack with a plurality of O-rings is still difficult to achieve and is labour intensive. Elastomeric materials which are chemically resistant to aggressive electrolyte chemicals are relatively costly and can make up a significant proportion of the total cost of such an assembly. Furthermore, the requirement for O-ring grooves may conflict with the easy and reliable fulfilment of the other functions of the frame, such as the flow distribution of liquid electrolytes, especially with stacks containing thin frames, for example when the thickness of the frame approaches <2.5 times the thickness of electrolyte feed channel.

It has also been proposed to create fluid seals with the avoidance of the cumbersome and costly assembly of O-rings by welding the layers together, for example using friction welding for frame to frame seals, and/or laser welding for electrode to frame seals. Disadvantages of this method include the possible disruption of carefully positioned and conditioned membranes by movement and/or heat during frame-to-frame sealing, the need to have compatible materials which can be welded together successfully, the inability to disassemble and the method of guaranteeing the reliability of the weld.

A further type of sealing arrangement has been proposed in which a sealing mechanism is incorporated into the form of the flow frame and in which a flexible blade locates with a special channel specifically for the purpose of completing the seal. A sealing arrangement of this type is disclosed in U.S. Pat. No. 4,640,876. The flexible blade which completes the seal is, however, difficult to manufacture and due to flexing would be susceptible to environmental and mechanical degradation.

FR-A-2292345 describes a tongue and groove arrangement for joining together the frame components of a electrical cell. The tongue on one frame is fitted into the corresponding groove on an adjacent frame and the frames fixed together using adhesives, solvents or ultrasonic welding.

FR-A-2700639 describes a seal formed by pinching a flat metallic sheet between a tongue and a groove formed opposite one another on adjacent frames, the sheet being pinched under the action of the means for compressing the stack of elements. The seal between the adjacent frames is maintained by the compression of the flat metallic sheet.

We have now developed an improved method for the fabrication of an electrochemical cell comprising a plurality of electrochemical components joined together in a stack in which method the tasks of locating, sealing and securing the stack components is achieved by a single integral sealing arrangement.

Accordingly, the present invention provides a method of fabricating an electrochemical or galvanic cell comprising a plurality of electrochemical components, which electrochemical components are joined together in a stack, which method comprises:

i) providing a first component formed from a deformable polymeric material with at least one substantially continuous groove comprising a female opening having a width of w and a depth of h;

ii) providing a second component with at least one substantially continuous upstand having a width of >w and a height of <h;

iii) pressing the first and second components together in order to provide an integral seal between the upstand on the second component and the opening in the first component, with the seal between the parts being provided by sealing engagement of the sides of the upstand with the sides of the opening; and iv) joining a plurality of first and second components together to form a stack.

In carrying out the method of the present invention the first component is formed from a deformable polymeric material, in order that when the first and second components are brought together an appropriate distribution of deformations will be obtained in order that the required seal can be obtained between the first and second components. Suitable polymeric materials from which the first component may be made include those capable of sustaining continued tensile stress and providing local compressive yield without catastrophic failure, particularly semi-crystalline polymers such as the many grades of polyethylene, polypropylene and their blends of copolymers, acetal, nylons, polyethylene terephthalate, polyvinylidene fluoride, polyvinyl-chloride, polytetrafluoroethylene, fluorinated ethylene-propylene copolymer, polyfluoroamide, chlorinated polyoxymethylene plus many others. In order to provide the first component of the desired configuration these polymeric materials may be machined, injection moulded, compression moulded or otherwise formed.

The material from which the second component is formed may be a deformable polymeric material, for example, it may be formed from the same polymeric material as the first component, although the second component does not have to be formed from a deformable polymeric material. Additional materials which can therefore be used in the construction of the second component are materials less resistant to sustained tension, such as heavily filled grades of the materials from which the first component may be made, and noncrystalline polymers such as polystyrene, polymethylmethacrylate and polycarbonate. Furthermore, it is also contemplated that the second component may be a metal electrode or a carbon, titania or ceramic component.

In a preferred embodiment of the present invention the substantially continuous opening provided in the first component has sides which are perpendicular or substantially perpendicular to the plane of the first component whilst the substantially continuous upstand provided on the second component has sides which are perpendicular or substantially perpendicular to the plane of the second component. It will be understood that the sealing system of the present invention will operate in any orientation, depending upon the orientation of the components which are to be joined together. Although perpendicular or substantially perpendicular seals are preferred, the seal may be angled at up to about 45°, if desired.

It will be understood that whilst the seal of the present invention preferably has a profile of a substantially constant cross section, the cross-section may vary along the length of the seal, if desired.

It will be understood that a plurality of components of an electrochemical galvanic cell are joined together in this manner. Accordingly, when the first and second components are formed from polymeric materials the second component will generally not only be provided with at least one substantially continuous upstand protruding from a first surface thereof, but it will generally also be provided with at least one substantially continuous female opening in the second surface thereof in order to enable it to be joined to a further component. It will be appreciated that any component which is provided with a female opening, even if it is also provided with an upstand, must be made from a deformable material. When the second component is made from a non-deformable material, such as a metal, a different arrangement is required in order to enable a plurality of components to be joined together. The second component will then generally be provided with upstands on both first and second surfaces, the upstand on the second surface enabling it to be joined to a further component made from a deformable material having a complementary groove formed therein.

On bringing the first and second components together, the interference between the sides of the opening and the sides of the upstand is such as to develop a degree of stress at their contact, typically 10 to 100 MN/m$^2$, sufficient to deform them into close conformity with one another. The shape of the upstand and the opening, in conjunction with the close conformity already obtained, is such as to sustain this stress at a level, typically 1 to 10 MN/m$^2$, sufficient to maintain the seal against the pressures used in electrochemical cells, typical ranging from 10 to 1000 KN/m$^2$. The degree of interference and the exact shapes of the upstand and the opening are determined from the mechanical properties of the materials from which they are made, the tolerances and surface finish with which they may be manufactured, and the facility of assembly and disassembly desired. It will be understood that use may also be made of end plates and tie bars, as necessary to maintain the integrity of the cell if it is internally pressurized.

The deformation induced by the misfit should be sufficient to reform the surfaces in contact with respect to irregularities. Generally, the degree of misfit between the width of the opening w of the first component and the width of the upstand of the second component is such as to generate a strain deformation of 0.1 to 20%, more preferably 3 to 5% in the material at the sealing surfaces.

Whilst the width of the upstand on the second component is greater than the width w of the female opening in the first component, so as to bring them forcibly into contact along their sides the reverse situation exists, in relation to the other adjacent parts of these components. It is important that these other adjacent parts are relieved so as to confine the forcible contact between the components to their sides. The depth of the root of the opening is thus greater than the height of the upstand, and the width of the mouth of the opening is greater than the width of the base of the upstand. The widening of the mouth of the opening and the relieving radius of the upstand also serves to preserve the sealing surfaces from damage during assembly, and facilitate the assembly process. The seal of the present invention thus is provided by the engagement of the sides of the upstand with the sides of the opening and does not require clamping of the stack either to form, or to maintain the seal. The forces which produce the seal of the present invention are thus perpendicular to the compressive forces in the stack of electrochemical components.

The shape of the root of the opening must, however, complement closely the shape of the upstand so as to retain the shape of the opening and sustain the forces arising from the contact between the two components. Similarly, the bulk of the material in the first component around the opening must be sufficient for this purpose, typically providing solid material around the opening to a distance of not less than the depth of the opening.

It will be understood that the first component may comprise a plurality of openings and the second component may comprise the same number of complementary upstands such that the two components are sealed and joined together at more than one location. Alternatively, the first component may be sealed to more than one second component so that the number of openings in the first component will equate to the number of upstands in the second components.

A plurality of electrochemical components may be joined together to form a sub-modular stack, for example a sub-modular stack containing 10 or more whole cells. In such an arrangement the membranes and other cell components are not unduly stressed. Such sub-modular stacks are relatively robust when formed and can be handled as a unit. Several sub-modular stacks can then be joined together using known techniques, or using the method of the invention in order to provide the desired final module. For example 10 sub-modular stacks could be joined together in order to provide a final module comprising up to 100 whole cells, or even more sub-modular stacks could be joined together in order to provide a final module comprising up to several 100 whole cells.

The method of the present invention enables an electrochemical or galvanic cell to be fabricated in a relatively easy manner to the required tolerances with the minimum of equipment, process steps and cost. Additionally and importantly, since the seal between the first and second components is generated by mechanical means it can be used in order to join components together which are made from different polymeric materials, including those which are incompatible to the welding techniques which have previously been used in the art. A further advantage of the method of the invention is that the components may be disassembled in order to trace and repair faults which need not necessarily be related to the sealing mechanisms but may be, for example, faults in the membrane or electrode.

In particular, the method of the present invention may be used to join the frame component of an electrochemical cell to the electrodes, even when the materials from which the frame and the electrodes are made are unsuitable to be welded together.

BRIEF DESCRIPTION OF THE DRAWINGS

The present invention will be further described with reference to the accompanying drawings in which:

Referring to FIGS. 1A and 1B of the drawings, a first component 1 formed from a deformable thermoplastics material such as high density polyethylene has a groove 2 of width w and height h formed therein. The second component 3 has an upstand 4 formed therein. It will be seen from the relative dimensions of the upstand 4 and the opening 2 that the upstand has a width greater than w and a height less than h.

The components 1 and 3 are press fitted together with the upstand 4 being pressed into the opening 2, the opening deforming sufficiently to receive the upstand.

Figure 1A:
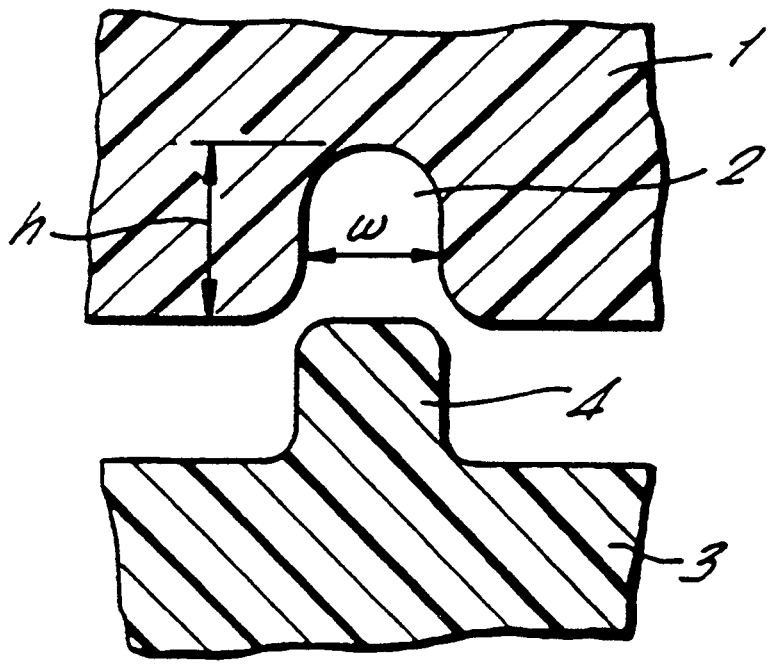
FIG. 1A shows a diagrammatic section through sections of a first component and a second component before being pressed together.
Figure 1B:
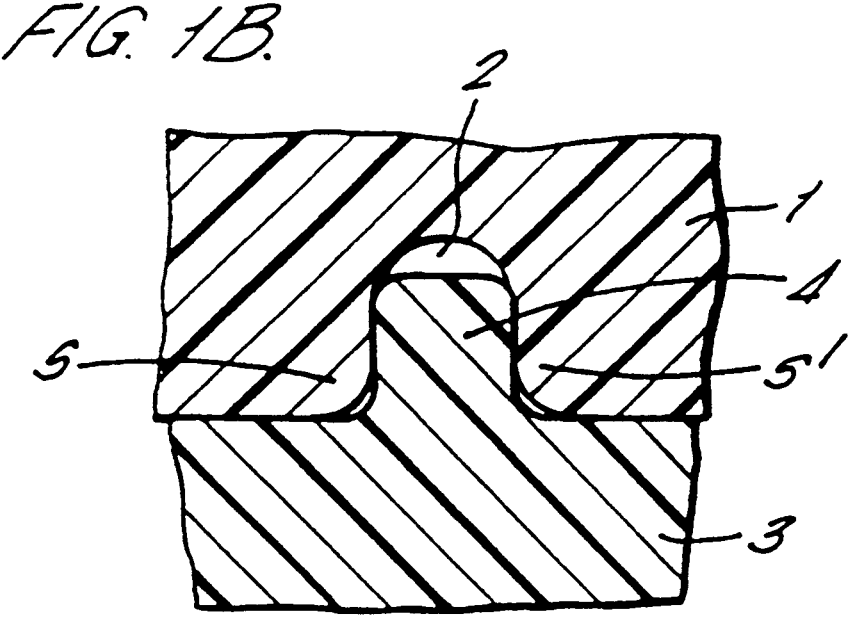
FIG. 1B shows a diagrammatic section through the first and second components of FIG. 1A when pressed together.

A seal between the two parts is provided between the vertical sides of the opening 2 and the upstand 4 as shown at S and S' on FIG. 1B of the drawings.

Figure 2:
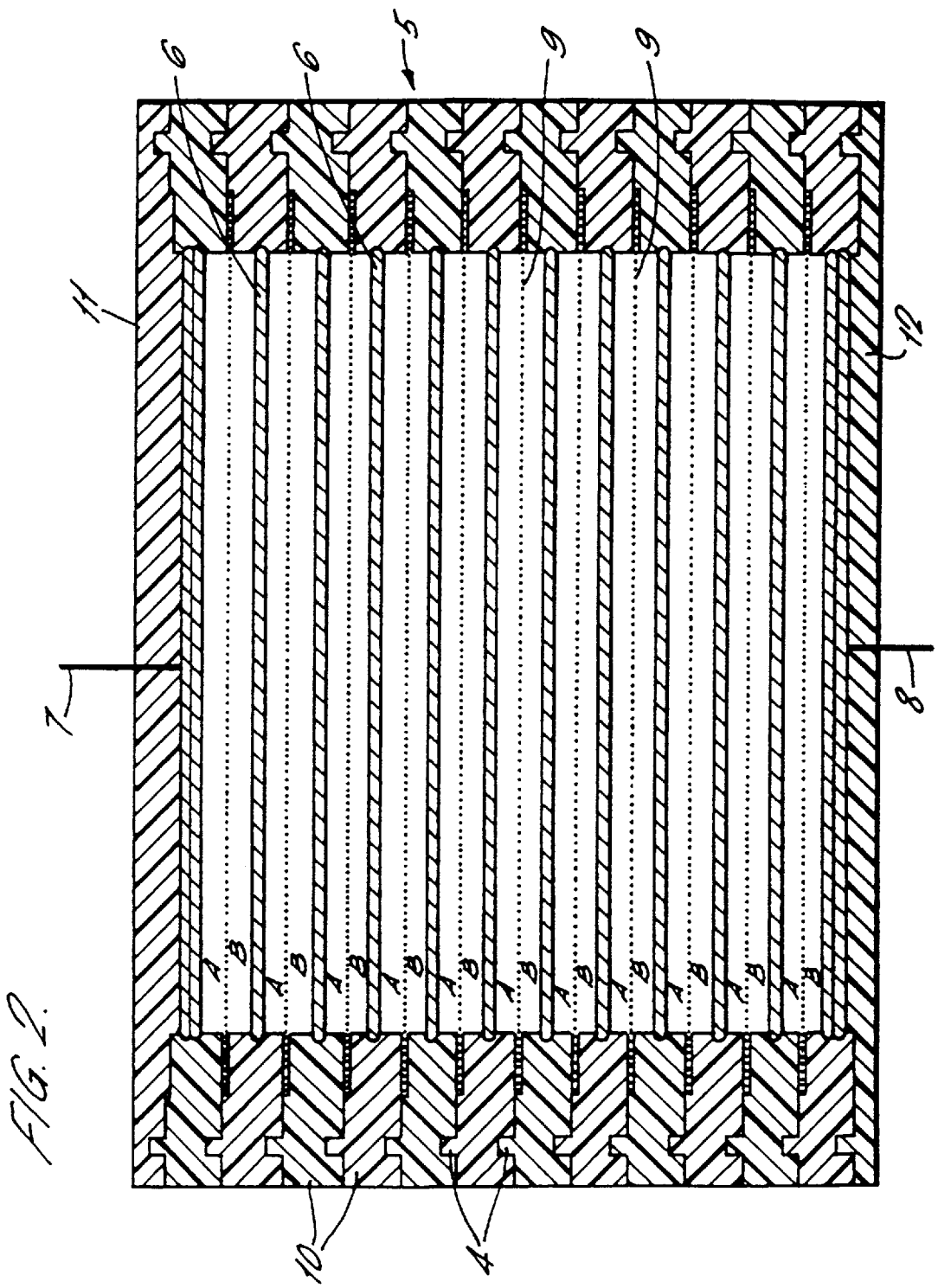
FIG. 2 shows a diagrammatic section through an electrochemical cell formed by the method of the invention.

Referring to FIG. 2, a redox flow battery 5 is shown in schematic cross-section. The battery comprises a stack of twelve bipolar electrodes 6 which are provided at either end of the stack with electrical connections 7 and 8. The bipolar electrodes are separated one from another by cation exchange membranes 9 and are each joined to an insulating flow frame 10. Each insulating flow frame 10 is joined to the next frame in the stack by a seal between the parts being formed as described with reference to FIGS. 1A and 1B. The upstands on the flow frames 10, which extend continuously or substantially continously around the frames, are shown at 4. The upstands 4 are pressed into corresponding continuous or substantially continuous grooves formed in the adjacent flow frame. The electrodes 6 are sealed to the insulating flow frames 10 by suitable means, not specifically shown.

Two electrolytes A and B fill the cavities formed between the alternate sides of the bipolar electrode 6 and the membranes 9. The flow distribution means for the electrolytes A and B are not shown.

The redox flow battery has end plates 11 and 12 which are profiled in such a manner that they can be sealed to the top flow frame shown in the stack and the bottom flow frame shown in the stack, respectively.

It will be understood that tie bars and end plates (not shown) may also be required to maintain the integrity of the cell if it is internally pressurized.

Figure 3A:
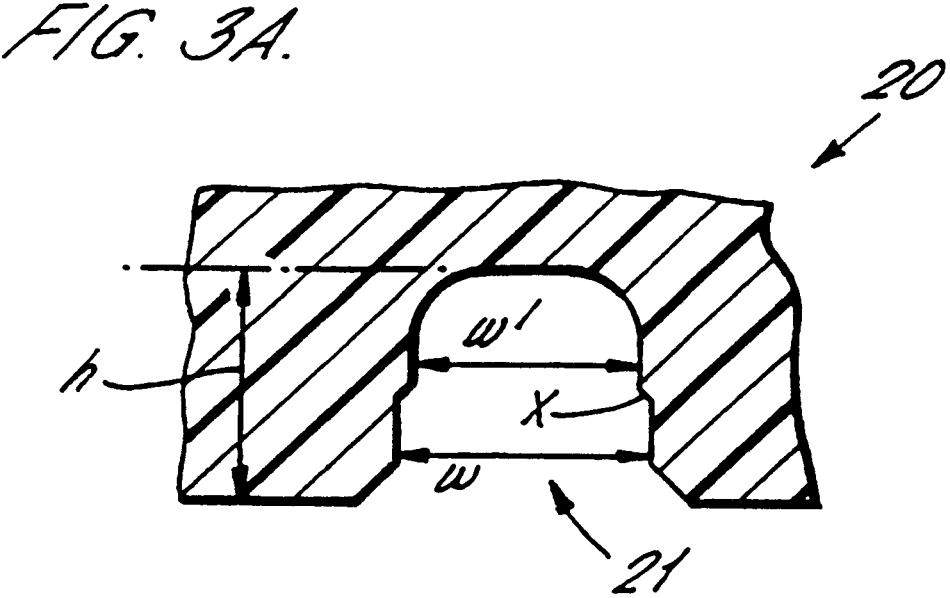
FIG. 3A and 3B show diagrammatic sections through sections of an alternative first component and an alternative complementary second component before being pressed together.
Figure 3B:
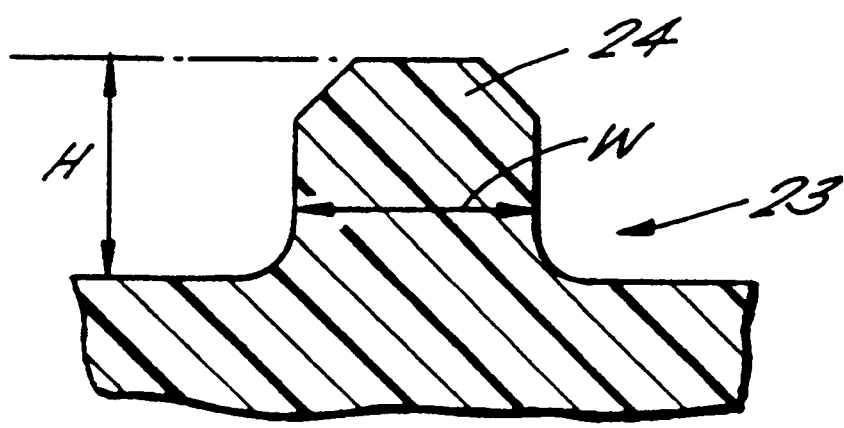

Referring to FIGS. 3A and 3B, a first component 20 (shown at 10× magnification in FIG. 3A) is formed from a deformable thermoplastic material, such as high density polyethylene. This component has an opening 21 which has a height corresponding to h. The walls of the opening have a minor inward slope beginning at point X on the wall. At the point X where the inner wall begins to slope, the opening has a width w of 2.614 mm and a width w' where the slope of the inner wall terminates of 2.358 mm.

A second component 23 (shown at 10× magnification in FIG. 3B) is formed from polyethylene. The second component has a upstand 24 formed therein. The upstand has a height H which is less than the height h of the opening 21 in FIG. 3A. At its widest point the upstand has a width W of 2.512 mm which is greater than the width w' of the opening 21.

The components 20 and 23 are press fitted together with the upstand 24 being pressed into the opening 21 which deforms sufficiently to accommodate it. With the design as illustrated in FIGS. 3A and 3B, the sealing area between components 20 and 23 is as small as practicable, which facilitates the assembly of the components and also the maintenance of the assembly as the forces generated are smaller than those encountered with designs with a larger sealing area.

What is claimed is:

1. A method of fabricating an electrochemical or galvanic cell comprising a plurality of electrochemical components, which electrochemical components are joined together in a stack, which method comprises:

i) providing a first component formed from a deformable polymeric material with at least one substantially continuous groove comprising a female opening having a width of w and a depth of h;

ii) providing a second component with at least one substantially continuous upstand having a width of >w and a height of <h;

iii) pressing the first and second components together in order to provide an integral seal between the upstand on the second component and opening in the first component, with the seal between parts being provided by sealing engagement of the sides of the upstand with the sides of the opening; and iv) joining a plurality of first and second components together to form a stack.

2. A method as claimed in claim 1 wherein the degree of misfit between the width of the opening w of the groove of the first component and the width of the upstand of the second component is such as to generate a strain deformation of from 0.1 to 20%.

3. A method as claimed in claim 2 wherein the strain deformation is from 3 to 5%.

4. A method as claimed in claim 1, wherein the first component comprises a plurality of substantially continuous grooves and the second component comprises the same number of complementarily positioned substantially continuous upstands.

5. A method as claimed in claim 1, wherein the first component is made from polyethylene, polypropylene, copolymers of polyethylene and polypropylene, acetal, nylons, polyethylene terephthalate, polyvinylidene fluoride, polyvinyl-chloride, polytetrafluoroethylene, fluorinated ethylene-propylene copolymer, polyfluoroamide, or chlorinated polyoxymethylene.

6. A method as claimed in claim 1, wherein the second component is made from filled grades of the materials from which the first component may be made, or polystyrene, polymethyl-methacrylate or polycarbonate.

7. A method as claimed in claim 1, wherein a plurality of electrochemical components are joined together to form a sub-modular stack.

8. A method as claimed in claim 7 wherein a plurality of sub-modular stacks are joined together in order to form a module.

9. A method as claimed in claim 8 wherein the module comprises up to several 100 whole cells.

10. A secondary battery, fuel cell or electrolyser which has been fabricated by a method as claimed in claim 1.

* * * * *